United States Patent Office 3,423,332
Patented Jan. 21, 1969

3,423,332
HYDROTHERMAL ACTIVATION OF A SILICA-ALUMINA CRACKING CATALYST AT A HIGH pH
Philip K. Maher, Baltimore, Richard W. Baker, Ellicott City, and Carl V. McDaniel, Laurel, Md., assignors to W. R. Grace & Co., New York, N.Y., a corporation of Connecticut
No Drawing. Continuation-in-part of application Ser. No. 330,262, Dec. 13, 1963. This application Jan. 19, 1966, Ser. No. 535,267
U.S. Cl. 252—455             4 Claims
Int. Cl. B01j *11/60;* C10g *23/02*

This application is a continuation-in-part of U.S. Ser. No. 330,262, filed Dec. 13, 1963, and now abandoned.

This invention relates to a new catalyst composition that is extremely stable, active and selective and the process for preparing this catalyst composition.

Silica-alumina cracking catalysts have been known for many years. These catalysts are divided into the catalysts that are prepared for use in fluid cracking units and the catalysts that are prepared for cracking units which do not use the fluid bed system of operation. The fluid cracking catalysts are often prepared to contain silica and alumina. The alumina is present in an "active form" and the balance of the catalyst is silica. These fluid cracking catalysts are in microspheroidal form and are prepared to contain 13%, 25%, and about 28% of this active alumina. They are characterized by the fact that the individual catalyst particles are small enough so that they can be used in a fluid cracking system and by the fact that they are essentially free of components other than silica and alumina.

The manufacturers of cracking catalysts have been continuously striving to improve the properties of their product. The crystalline aluminosilicates, known as molecular sieves, have been added to cracking catalysts to improve their properties. These molecular sieves are advantageous in the catalyst system in that they produce a composite catalyst that is more active and selective.

One of the problems encountered in the preparation of cracking catalysts containing molecular sieves is the fact that the molecular sieves are generally prepared in the alkali metal ion form. Since sodium, potassium and other alkali metals have a deleterious effect in the final catalyst, they are systematically removed in the final steps in the processes for preparation of these catalysts. The zeolites may be base exchanged to remove the sodium and to prepare the catalyst in the hydrogen, rare earth or other ion forms so that the problem of removal of alkali metal ions from the catalyst may be solved in this manner. The preparation of the cracking catalyst to contain molecular sieves poses several difficulties in catalyst preparation. Very careful control of the system is essential to assure that the molecular sieves are incorporated in the catalyst in the manner that will not have adverse effects on overall catalyst properties.

We have found that an extremely stable active and selective cracking catalyst can be prepared by a unique process in which the catalyst is tetrahedralized or activated in situ. This process prepares a silica-alumina catalyst which is superior to the present products prepared by other standard techniques. It is also a process to rejuvenate cracking catalysts that have been used in the cracking cycle long enough to be termed "spent" or "equilibrium" catalysts.

Very briefly, the process comprises preparing a silica-alumina mixture by any of the standard methods and hydrothermally treating the mixture at a high pH. The high pH can be developed by sodium hydroxide, potassium hydroxide, other inorganic bases, ammonia and certain organic bases. The hydrothermal reaction is carried out at temperatures of from 20 to 150° C.

This unique tetrahedralization, activation or rejuvenation technique can be readily used to form a new highly stable catalyst from clay and other raw materials as well as from the conventional cracking catalyst. Various mixtures can also be prepared using our novel process.

Without being restricted to any particular theory to explain the superior catalyst prepared by the in situ activation or rejuvenation process, we believe the desirable properties of our catalyst are due to the creation and maintenance of a larger number of alumina tetrahedra in the catalyst mass. The catalyst of our invention differs from the zeolite promoted cracking catalysts in that there is no crystallinity in our catalyst detectable by conventional X-ray diffraction techniques. Thus our catalyst does not have some of the deleterious properties typical of crystalline catalysts.

The first step of our process is the selection of the proper material for the activation or rejuvenation treatment. Although the invention will be described by using a silica alumina cracking catalyst, other materials such as "equilibrium cracking catalysts," clay (raw or calcined), mixed clay-silica-alumina-catalyst, silica-alumina-magnesia catalyst, silica-alumina-zirconia catalyst, and silica-magnesia catalyst may be used in the preparation of our novel catalyst.

After the proper material for preparation of the catalyst is selected, it is treated with a suitable basic substance at a high pH. The high pH can be developed by sodium hydroxide, potassium hydroxide, ammonia or organic bases, such as for example, piperidine, tetrabutyl ammonium hydroxide, etc.

In the next step of the process, the silica-alumina catalyst is added to a solution of the basic material. When sodium hydroxide is used in the activation or tetrahedralization of a silica-alumina catalyst, for example, the sodium hydroxide pellets are dissolved in water and cooled to 30° C. The catalyst is then added to the caustic solution with agitation. After the caustic solution has been thoroughly mixed with the raw materials to be activated or rejuvenated, the material is subjected to a hydrothermal conversion step. The hydrothermal conversion can be carried out at temperatures of from about 30 to 150° C. The time of the reaction is, of course, greatly dependent on the temperature. When the conversion takes place at a temperature of about 40° C., for example, a time of about 18 hours is sufficient. Increasing the temperature of the conversion step shortens the time required for the conversion. Thus, at a temperature of about 80° C. for example, the hydrothermal conversion would be essentially complete in a period of about 2 hours. If the temperature were increased to about 110° C., the conversion would be complete in a period of about 30 minutes.

Changing the concentration of the reactants would also alter reaction time.

Alternately, we may use a combination of a low temperature (i.e., 20 to 40° C.) conversion with a subsequent high temperature conversion (i.e., about 100° C.) Such a reaction would give satisfactory results.

After this activation or rejuvenation is complete, the new catalyst is usually subjected to additional treating steps. The catalyst at this point contains sodium ions or cations of other basic solutions used in the catalyst preparation, in its structure. Thus, in the typical example in which a silica-alumina cracking catalyst was activated using sodium hydroxide, the product had an empirical formula of 0.75 $Na_2O:1Al_2O_3:10.9SiO_2:XH_2O$. The sodium content must be reduced to less than 1%, preferably less than 0.5%, before the catalyst is ready for use in a catalytic conversion system. This removal may be effected in any one of several ways depending on the type of basic material used in the activation or rejuvenation step. When alkali metal bases are used, for example, the alkali metal can be removed from the catalyst by a wash with a dilute (2 to 10%) ammonium chloride or ammonium sulphate solution. In addition alkali metal ions may be replaced by other non-alkali metal cations such as for example $Ca^{++}$, $Mg^{++}$, rare earth ions, etc. This exchange is carried out by mixing the catalyst with a solution of salts of calcium, magnesium, the rare earths, etc., in a concentration of about 2 to 20 weight percent. Preferably, this exchange is carried out with a solution of the commercially available product sold as "mixed rare earth chlorides."

If ammonia or any of the organic bases are used in the activation, the base can be removed by simply heating to a temperature high enough to drive off the base. After the basic ions have been removed, the catalyst product is washed with water and dried at 110° C. The catalyst is then ready for use in a catalytic conversion system.

The invention is illustrated by the following specific but nonlimiting examples:

EXAMPLE I

In this example, the raw material used was a commercial silica-alumina cracking catalyst containing 13% active alumina. The process for preparing this catalyst is not part of this invention. A suitable method of preparing this catalyst is described in U.S. Patent 2,886,512 to Winyall. Very briefly, the process comprises the steps of preparing a sodium silicate solution, gelling the sodium silicate solution with carbon dioxide, adding an aluminum sulphate solution in a quantity sufficient to provide the desired alumina content in the final catalyst, filtering, washing, driving, and recovering the catalyst product.

In this run, 21.7 grams of sodium hydroxide pellets were dissolved in 696 grams of water. The resulting solution was cooled to a temperature of 30° C. and a total of 236.6 grams of a commercial 13% alumina catalyst was added to the caustic solution with agitation. After the addition was complete, the temperature of the mixture was raised to 40° C. and the mixture maintained at that temperature for a period of 18 hours. The sodium-alumino-silicate catalyst precursor formed was then filtered, washed thoroughly, and dried at 110° C. for 18 hours. The catalyst had the empirical formula of $$0.83Na_2O:1Al_2O_3:10.9SiO_2:XH_2O$$

The catalyst precursor was mixed with a small quantity of water and base exchanged three times at a temperature of 50° C. with a solution of 28.7 grams of ammonium chloride and 567 grams of water. After the exchange, the catalyst was washed thoroughly with water and dried at 110° C. The finished catalyst had a surface area of 441 m.²/g. and a pore volume was 0.60 cc. per gram. The product contained 0.29% $Na_2O$. The surface area and pore volume were determined using the well known Brunauer-Emmett-Teller method.

EXAMPLE II

The method used in Example I was repeated to prepare a much larger volume of catalytic material. In this run, a total of 1,533 grams of sodium hydroxide pellets were dissolved in 48,400 grams of water. The temperature of the solution was 85° F. A total of 16,469 grams of a commercial 13% silica-alumina catalyst was added to the sodium hydroxide solution with constant stirring. The mixture was heated to 100° C. and the hydrothermal reaction carried out at this temperature for a period of 18 hours. The sodium-alumino-silicate catalyst precursor formed was then filtered and washed thoroughly with water.

A small sample was dried at 110° C. for 18 hours. The dried sample was analyzed and found to have the empirical formula $$0.75Na_2O:1Al_2O_3:10.9SiO_2:XH_2O$$

The nitrogen surface area was 457 m.²/g. The balance of the wet product was then base exchanged twice with 15 gallons of a 10% ammonium chloride solution prepared by adding 6,000 grams of ammonium chloride to 15 gallons of water. The exchange was carried out at 50° C. The finished catalyst was washed thoroughly with water and dried at 110° C. The finished catalyst had a surface area of 510 m.²/g. and contained 0.08 percent $Na_2O$.

EXAMPLE III

The catalyst prepared according to the process described in Examples I and II was exchanged with rare earth cations. In this process, the spray dried product was base exchanged with an ammonium salt as in Example I and then exchanged with a solution of rare earth salts.

In this run, 10,000 grams of the wet zeolite catalyst as prepared in Example II (4,444 grams dry basis) in the ammonium form was base exchanged with a 5% solution of a commercially available mixture of rare earth chlorides. The solution was prepared by dissolving 1,320 grams of the rare earth chloride powder in 3,000 grams of water. The exchange was carried out by mixing the catalyst and the chloride solution at a temperature of 50° C. for a period of one hour. The finished catalyst was washed with water, and dried at 110° C. A yield of 5,373 grams of dried catalyst was recovered. The analysis of the product was as follows:

Table

Total volatiles, 19.94%

| | Percent |
|---|---|
| $Al_2O_3$[1] | 14.94 |
| $SiO_2$[1] | 78.88 |
| $Na_2O$[1] | 0.0052 |
| $RE_2O_3$[1] | 7.41 |

[1] Dried basis.

EXAMPLE IV

The cracking characteristics of the catalyst prepared by in situ activation were evaluated in a series of runs in which the catalyst prepared according to the processes described in Examples I, II and III were subjected to a activity test in fluid bed pilot unit. The catalysts were all given a mild deactivation treatment by heating to 1,225° F. in the presence of steam for a period of 20 hours. After this treatment, the catalyst was introducing into a fluid bed pilot unit and evaluated at 920° F. Cracking temperature using West Texas heavy gas oil and a catalyst to oil weight ratio of 4. The unit was operated at a weight hourly space velocity of 5. The results obtained from this series of runs is set out in the table below.

TABLE.—CHEMICAL ANALYSIS AND PHYSICAL PROPERTIES

Chemical Analysis

| | Catalyst, 13% Al/si | Catalyst of Examples— | |
|---|---|---|---|
| | | I and II | III |
| Components: | | | |
| Rare earth oxides | | | 5.5 |
| $Na_2O$ | 0.04 | 0.055 | 0.05 |
| $Al_2O_3$ | 13.6 | 12.4 | 12.3 |

Physical Properties—After Steam Treatment

| | Catalyst, 13% Al/si | Catalyst of Examples I and II | Catalyst of Examples III |
|---|---|---|---|
| Surface area in $M.^2/g$ | 229 | 252 | 205 |
| Pore volume in cc./g | 0.59 | 0.59 | 0.53 |

Cracking Performance at 5 W.H.S.V.

| | | | |
|---|---|---|---|
| Total conversion, vol. percent | 55 | 64.5 | 56 |
| $H_2$, wt. percent | 0.045 | 0.145 | 0.115 |
| Hydrocarbons: | | | |
| $C_1$ and $C_2$ in wt. percent | 1.7 | 1.7 | 1.6 |
| $C_3$'s in vol. percent | 8.6 | 10.8 | 9.0 |
| $C_4$'s in vol. percent | 8.1 | 15.3 | 8.6 |
| Gasoline: | | | |
| $C_5$ and better in vol. percent | 46.5 | 49.0 | 47.5 |
| Gasoline octane numbers | 93.4 | 94.4 | 94.2 |
| Gasoline+3 cc. tetraethyl lead/gal | 98.0 | 98.8 | 98.9 |
| No. 2 fuel oil, vol. percent | 11.0 | 10.0 | 10.5 |
| Coke, wt. percent | 3.0 | 4.1 | 2.6 |

It is obvious from a review of these data that the catalysts prepared by tetrahedralization are superior to 13% alumina-silica, the commercial catalyst. The surface area of the ammonium exchanged catalyst is slightly higher than the surface area of this standard silica-alumina catalyst. The pore volumes of the new catalysts are essentially the same as the pore volumes of the silica-alumina catalyst.

The ammonium form of this catalyst converted 64.5% of the hydrocarbons as compared with 55% in the 13% alumina-silica catalyst. The gasoline production was significantly higher than that of the 13% alumina-silica catalyst. The rare earth exchanged material converted 1 vol. percent more of the feed and made 1.5 vol. percent more $C_5+$ gasoline than the 13% alumina-silica catalyst.

The octane number of the gasolines prepared with the catalysts of this invention was in the same range as the octane numbers of the gasoline recovered from the synthetic silica-alumina catalyzed conversion. The number 2 fuel oil conversion was essentially the same. The coke for the catalyst from Example I and II was higher than the coke from the catalyst containing 13% alumina. This is to be expected in view of its much higher conversion of the feedstock. The catalyst in the rare earth form had the lowest weight percent coke of any of the catalysts present.

In summary, the catalyst prepared according to the Examples I, and II are substantially better in all respects than the 13% silica-alumina catalyst from which the materials were made.

Further comparison of the catalyst of Examples I and II and the 13% alumina-silica catalyst were made after the catalysts had been subjected to deactivation conditions which are more representative of the severity of the deactivation occurring in many commercial units. In this example, the catalysts of Examples I and II and the 13% alumina-silica catalyst were deactivated by heating at 1520° F. in a flowing mixture of 70% air and 30% steam for 18 hours. After this steam treatment, the catalysts were evaluated in a fluid bed pilot unit. West Texas heavy gas oil was cracked at 920° F. and a catalyst to oil weight ratio of 4. The unit again was operated at a weight hourly space velocity of 5. The results from this series of runs is set out in the table below.

TABLE.—PHYSICAL PROPERTIES AFTER 1,520° F. 30% STEAM TREATMENT

| | Catalyst, 13% Al/Si | Catalyst of Examples I and II |
|---|---|---|
| Surface area in $m.^2/g$ | 98 | 131 |
| Pore volume in cc./g | 0.40 | 0.55 |

Cracking Performance at 5 W.H.S.V.

| | | |
|---|---|---|
| Total Conversion, vol. percent | 44.0 | 53.0 |
| $H_2$, wt. percent | 0.056 | 0.134 |
| $C_1+C_2$, wt. percent | 1.6 | 1.5 |
| $C_3$'s, vol. percent | 5.9 | 7.9 |
| $C_4$'s, vol. percent | 6.9 | 6.8 |
| Gasoline: | | |
| $C_5$ and better, vol. percent | 38.0 | 45.5 |
| Gasoline octane number | 92.4 | 93.6 |
| Gasoline+3 cc. tetraethyl lead/gal | 97.3 | 98.2 |
| No. 2 fuel oil, vol. percent | 12.0 | 11.0 |
| Coke, wt. percent | 2.1 | 3.1 |

After this deactivation, the surface area and pore volume values of the tetrahedralized catalyst are significantly higher than those of the 13% alumina-silica catalyst. This catalyst of Examples I and II also has superior cracking activity and greater selectivity for $C_5+$ gasoline production. At this constant 5 W.H.S.V. feed rate, it converts 9 vol. percent more of the feed and yields 7.5 vol. percent more $C_5+$ gasoline. This demonstrates the unique ability of this catalyst, after a deactivation simulating that taking place in commercial units, to convert most of its incremental gain in conversion over 13% alumina-silica into $C_5+$ gasoline. Furthermore, this gasoline has higher octane numbers than that from the 13% alumina-silica catalyst. Coke yield from the tetrahedralized catalyst is somewhat higher due to its much higher conversion of the feed.

Obviously, many modifications and variations of the invention as here and above set forth may be made without departing from the essence and scope thereof and only such limitations should be applied as are indicated in the appended claims.

We claim:

1. A process for preparing an improved silica-alumina cracking catalyst having an alumina content of about 5 to 45 percent which comprises the steps of:
   (a) selecting a suitable fresh silica-alumina catalytic base material,
   (b) adding a sufficient quantity of an alkali metal hydroxide to increase the pH of the resulting slurry to about 10 to 14,
   (c) heating the composite to about 30 to 150° C. for about 18 to 0.5 hours to complete activation and to thereby form an essentially amorphous product,
   (d) reducing the alkali metal content of the product to below about 1.0 percent by ion exchange with a solution of an ammonium salt selected from the group consisting of ammonium chloride and ammonium sulfate,
   (e) washing, drying and recovering the product.

2. The process according to claim 1 wherein the catalytic material is a silica-alumina cracking catalyst containing 13% alumina, a sufficient quantity of sodium hydroxide solution is added to said catalyst to give a slurry with pH of about 11, said slurry is heated to a temperature of about 100° C. for about 5 hours and the alkali metal content is reduced by ion exchange with an ammonium salt solution.

3. A process according to claim 1 wherein the alkali metal content of the catalyst is reduced by exchange with an ammonium salt solution and the catalyst is converted to the rare earth form by exchange with a quantity of a solution of mixed rare earth salts.

4. The process according to claim 3 wherein the conversion to the rare earth form is effected by exchange with a 5 percent rare earth chloride solution at a temperature of about 50° C. for a period of about one hour.

References Cited

UNITED STATES PATENTS

| | | | |
|---|---|---|---|
| 2,429,981 | 11/1947 | Bates | 208—120 |
| 3,065,054 | 11/1962 | Haden et al. | 23—112 |
| 3,247,195 | 4/1966 | Kerr | 260—242 |
| 2,814,598 | 11/1957 | Swegler | 252—412 |
| 3,140,253 | 7/1964 | Plank et al. | 208—120 |

DELBERT E. GANTZ, *Primary Examiner.*

T. H. YOUNG, *Assistant Examiner.*

U.S. Cl. X.R.

208—120